United States Patent [19]

Muranaka et al.

[11] 4,327,400
[45] Apr. 27, 1982

[54] ELECTRIC DOUBLE LAYER CAPACITOR

[75] Inventors: Takayoshi Muranaka, Moriguchi; Hajime Mori, Uji, both of Japan

[73] Assignee: Matsushita Electric Industrial Co., Ltd., Kadoma, Japan

[21] Appl. No.: 109,406

[22] Filed: Jan. 3, 1980

[30] Foreign Application Priority Data

| Jan. 10, 1979 | [JP] | Japan | 54-1607 |
| Jan. 10, 1979 | [JP] | Japan | 54-1608 |
| Jan. 10, 1979 | [JP] | Japan | 54-1609 |
| Jan. 10, 1979 | [JP] | Japan | 54-1610 |
| Feb. 20, 1979 | [JP] | Japan | 54-19216 |
| Oct. 12, 1979 | [JP] | Japan | 54-132335 |

[51] Int. Cl.$^3$ .......................... H01G 9/00; B01J 17/00
[52] U.S. Cl. ........................................ 361/433; 29/570
[58] Field of Search .......................... 361/433; 29/570

[56] References Cited

U.S. PATENT DOCUMENTS

| 711,481 | 10/1902 | Daboll | 361/433 |
| 1,137,373 | 4/1915 | Aylsworth | 361/433 |
| 1,243,654 | 10/1917 | Clark | 361/433 |
| 2,085,413 | 6/1937 | Bloomenthal | 361/433 |
| 2,638,523 | 5/1956 | Rubin | 361/433 |
| 2,929,004 | 3/1960 | Lilienfeld | 361/433 |
| 3,332,867 | 7/1967 | Miller et al. | 361/433 |
| 3,536,963 | 10/1970 | Boos . | |
| 3,656,027 | 4/1972 | Isley | 361/433 |

FOREIGN PATENT DOCUMENTS

| 1921610 | 1/1970 | Fed. Rep. of Germany . |
| 2163569 | 7/1972 | Fed. Rep. of Germany . |
| 2322187 | 11/1973 | Fed. Rep. of Germany . |
| 2322188 | 1/1974 | Fed. Rep. of Germany . |
| 53-7025 | of 1978 | Japan . |
| 54-9704 | of 1979 | Japan . |
| 54-24100 | of 1979 | Japan . |

OTHER PUBLICATIONS

Rompps Chemie–Lexikon, 7th Edition (1976), Franckh'sche Verlagshandlung Stuttgart, p. 2780.

Primary Examiner—Andrew J. James
Attorney, Agent, or Firm—Cushman, Darby & Cushman

[57] ABSTRACT

An electric double layer capacitor comprising a pair of polarization electrodes and an electrolyte disposed in-between and utilizing an electric double layer formed at the interface between the polarization electrodes and the electrolyte, wherein the polarization electrodes comprise a carbon electrode material and polyvinylpyrrolidone as a binder thereof; and therefore adherence, conductivity and a molding characteristic of the carbon electrode material are increased thereby improving characteristics as the capacitive device and reliability of the electric double layer capacitor.

15 Claims, 9 Drawing Figures

ELECTRIC DOUBLE LAYER CAPACITOR

BACKGROUND OF THE INVENTION

1. Field of the Invention

The present invention relates to a capacitive device utilizing an electric double layer and containing an electrolyte therein.

2. Description of the Prior Art

An electric double layer capacitor using an electric double layer formed at an interface between a polarization electrode and an electrolyte has a distinctive feature that a thickness of the electric double layer is only several Å, that is, extremely thin in comparison with that of a conventional aluminum electrolytic capacitor. The aluminum electrolytic capacitor has a dielectric layer of about 14 Å/V in thickness (normalized by a high breakdown voltage), and has an electrode surface area of several $m^2/g$ (normalized by a weight of the electrode). On the other hand, the electric double layer capacitor has the electric double layer of several Å/V (normalized by a low breakdown voltage), and has a large electrode surface area of 700–1,400 $m^2/g$. Therefore, there is a possibility to provide a capacitive device having such an extremely large capacitance as several F by employing the electric double layer capacitor.

FIG. 1 is a schematic sectional view of a conventional electric double layer capacitor. The electric double layer capacitor comprises two polarization electrodes 1 and a separator 2 disposed between the polarization electrodes 1. The polarization electrodes 1 comprise a carbon electrode material such as graphite, carbon black, or active carbon. The separator 2 is impregnated with an electrolyte. A large capacitance of the electric double layer capacitor arises from a capacitance of electric double layers 3 existing at the interfaces between the polarization electrodes 1 and the electrolyte, and from a large surface area of the carbon electrode material.

Active carbon is widely used for the carbon electrode material since it has a large surface area. Active carbon has a surface area of 500–1,500 $m^2$ per gram. It is preferable to employ active carbon prepared from vegetable matter by giving a steam activation treatment thereon. The active carbon prepared from vegetable matter is superior in purity in comparison with active carbon prepared from animal tissue. The most preferable active carbon is, for example, wood charcoal prepared from sawdust or coconut charcoal from coconut husks.

The present inventors have studied a possibility to provide electric double layer capacitors employing active carbon as a main electrode material. It was found that active carbon easily adhered to conducting members of the polarization electrodes by employing the following materials in the electric double layer capacitor, and that thus the adherence, conductivity and a molding characteristic of the polarization electrode was effectively improved. The materials are polytetrafluoroethylene (grouped in fluorinated rubber) as a dispersing agent, and acetylene black as an agent for improving the conductivity. The present inventors have developed electric double layer capacitors which comprise polarization electrodes prepared by mixing active carbon, acetylene black and a dispersoid containing polytetrafluoroethylene in an appropriate ratio.

TABLE 1

| item of characteristics | mixing rate against active carbon | acetylene black small ⟵⟶ large | polytetrafluoroethylene small ⟵⟶ large |
|---|---|---|---|
| internal resistance | | large ⟵⟶ small | small ⟵⟶ large |
| capacitance | | large ⟵⟶ small | large ⟵⟶ small |
| molding characteristic | | bad ⟵⟶ good | bad ⟵⟶ good |

Table 1 shows characteristics of the electric double layer capacitors obtained by changing mixing rates of acetylene black and an aqueous dispersion containing polytetrafluoroethylene against an amount of active carbon. The measured characteristics are an internal resistance, a capacitance and a molding characteristic and tabled in Table 1, from which the characteristics of the capacitive device is roughly estimated. It is known from Table 1 that the molding characteristic can be improved by increasing the mixing rate of the aqueous dispersion containing polytetrafluoroethylene against the active carbon amount, and that the internal resistance is thereby increased together with a slight reduction (within 5%) of the capacitance of the capacitive device.

SUMMARY OF THE INVENTION

The present invention provides an electric double layer capacitor comprising polarization electrodes and an electrolyte disposed in-between and utilizing electric double layers formed at the interfaces between the polarization electrodes and the electrolyte, wherein the polarization electrodes comprise a carbon electrode material and polyvinylpyrrolidone as a binder thereof, and thereby adherence, conductivity and a molding characteristic of the carbon electrode material are increased thereby improving capacitive device characteristics and reliability of the electric double layer capacitor.

DESCRIPTION OF THE PREFERRED EMBODIMENTS

The present invention provides an electric double layer capacitor comprising polarization electrodes of a carbon electrode material and a separator impregnated with an electrolyte and disposed between the polarization electrodes, wherein the carbon electrode material comprises polyvinylpyrrolidone as a binder.

The present inventors proceeded with research activities in the investigation of a binder material suitable for the improvement of the device characteristics in the molding characteristic and the reduction of the internal resistance.

Table 2 is a comparison table for characteristic items in several capacitive devices using several different binder materials for the carbon electrode materials.

TABLE 2

| binder material | Characteristic items | | | |
|---|---|---|---|---|
| | internal resistance | capacitance | leak current | molding characteristic |
| none except polytetrafluoroethylene | O | O | O | O |
| CMC (carboxymethyl cellulose) | X | X | X X | O |
| silicone rubber | X | X | X | X |
| PVA (polyvinyl alcohol) | X | X | X | X |
| gum arabic | X | O | X X | X |
| starch | X | O | X X | O |
| PVP (polyvinylpyrrolidone) | O O | O | O O | O |
| gelatin | X | X | X | X |

O O: Very good;
O: good;
X: insufficient;
X X: bad

It is known from Table 2 that PVP (polyvinylpyrrolidone) has a superior characteristic as a binder in comparison with the conventional binding material. In particular, it is found that an electric double layer capacitor has a low leak current by employing PVP as the binding material.

Figure 1:
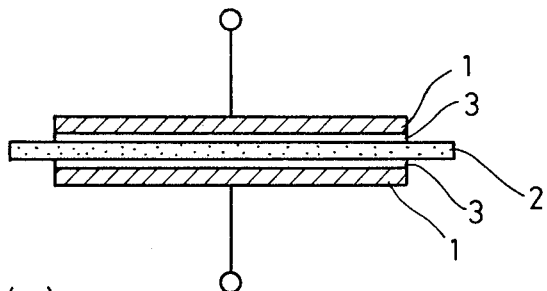
FIG. 1 is an elevational sectional view schematically showing a conventional electric double layer capacitor.
Figure 2A:
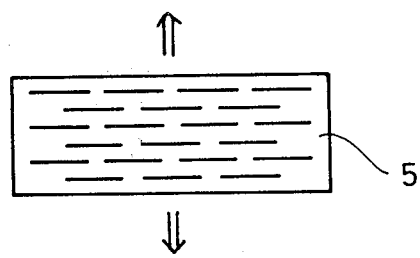
FIGS. 2(a) to 2(d) are a view schematically showing a production step of a polarization electrode together with an elevational sectional view of the polarization electrode and an enlarged top view of an expanded metal net as a conducting member thereof.
Figure 2B:
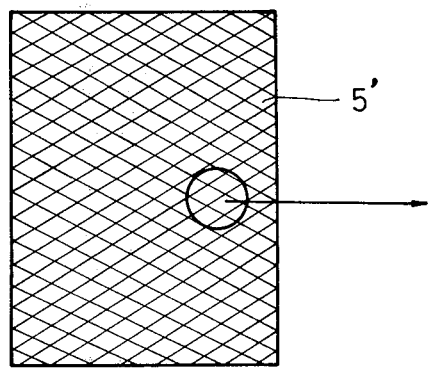
Figure 2C:
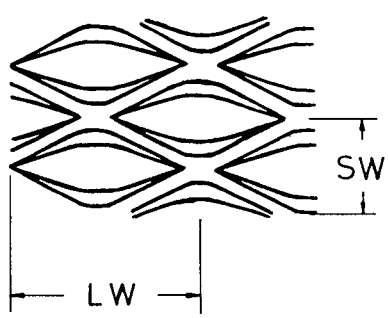
Figure 2D:
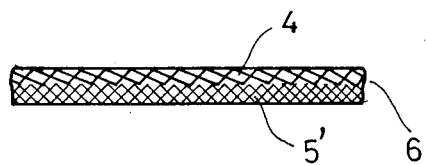

FIGS. 2(a) to 2(d) are a view schematically showing a production step of a polarization electrode together with an elevational sectional view of the polarization electrode, and an expanded top view of an expanded metal net as a conducting member thereof. An aluminum thin metal plate 5 of high purity is worked to have a number of slots thereon apart from each other with uniform distances as shown in FIG. 2(a), and then it is expanded so as to widen the slots resulting in the expanded metal net 5' (FIG. 2(b)). The expanded metal net 5' has a number of openings made by the expanded slots, which openings have a small width (SW) of 0.5–1.0 mm, a large width (LW) of 1.0–2.0 mm as shown in FIG. 2(c). The expanded metal net 5' has an opening density, i.e. opening rate of 40–60%, and the apparent thickness thereof is 2.5–4.0 times that of the original Al thin metal plate 5. The opening rate of the expanded metal net 5' is expressed by a ratio (in %) of an intensity of illumination measured under the expanded metal net 5' by exposing it to a light to an intensity of illumination measured after removing the expanded metal net 5' from the light path.

On the other hand, active carbon and a small amount of a binder containing PVP are mixed to form a rubber-like carbon electrode material. The carbon electrode material is then uniformly adhered to the expanded metal net 5' by using rolling rollers, thus resulting in a layer 4 on the expanded metal net 5' to be used as the conducting member. The layer 4 and the expanded metal net 5' constitute a polarization electrode 6. The polarization electrode 6 of a suitable size is obtained after cutting the expanded metal net 5' together with the layer 4.

Figure 3:
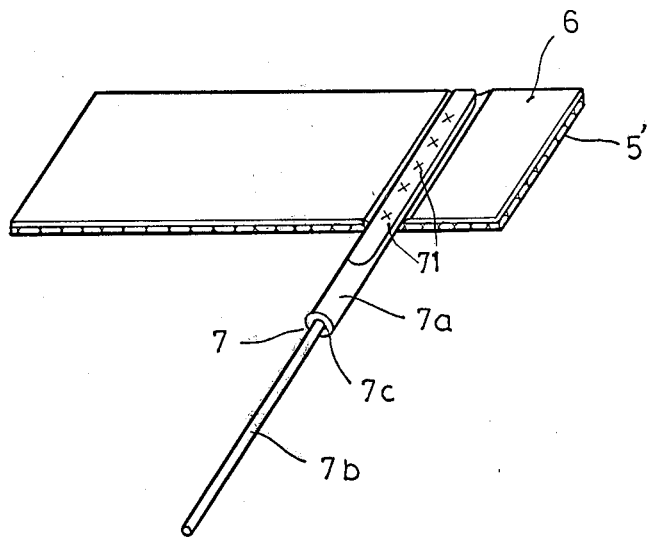
FIG. 3 is a perspective view showing that a lead wire is attached to the polarization electrode of FIG. 2 by pins.

FIG. 3 is a perspective view showing that a lead wire is attached to the polarization electrode 6 of FIG. 2 by pins 71. An internal wire 7a of aluminum and an external wire 7b of a soft copper wire coated with a tin plating layer are placed opposite another to make a butt welding. The two wires 7a and 7b constitute a lead wire 7 to be attached to the polarization electrode 6.

Figure 4:
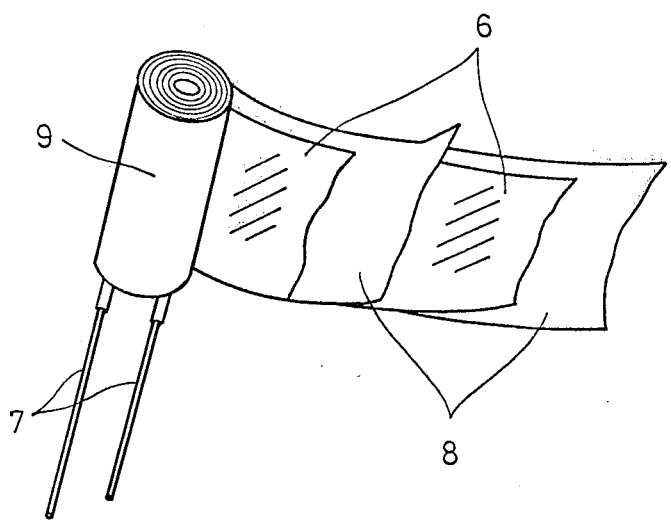
FIG. 4 is a perspective view showing that a pair of the polarization electrodes of FIG. 3 is rolled together with separators to produce an electric double layer capacitor.

FIG. 4 is a perspective view showing that a pair of the polarization electrodes 6 of FIG. 3 is rolled together with separators to produce a capacitor element 9 of a cylindrical shape. The capacitor element 9 is then impregnated with an electrolyte and placed in a casing followed by a sealing treatment to obtain a completed electric double layer capacitor.

The electric double layer capacitor in accordance with the present invention has the following distinctive features by employing the expanded metal net 5' with the abovementioned characteristics. That is, the production efficiency is improved, since the rubber-like carbon electrode material strongly adheres to the expanded metal net 5' and thus peeling-off of the carbon electrode material hardly occurs during the rolling processing. Moreover, the internal resistance is lowered and besides dispersion of the internal resistances in several capacitors becomes small.

It is preferable that the separator used for the electric double layer capacitor satisfy the following conditions: It does not prevent the movement of the ions in the electrolyte and at the same time it should serve as an insulating material of the electron-related conduction between the polarization electrodes. Moreover, the separator should be porous and besides the porosity thereof should be high enough to prevent the electrical contact of the polarization electrodes disposed confronting one another with the separator inbetween. This electrical contact must be avoided since it causes short-circuiting of the capacitor and/or increasing of the leak current in the capacitor.

There is no problem to use an ionic conduction membrane having no pores like ionic exchange membranes as the separator. Commonly used separators are a porous film and porous nonwoven fabrics of polyethylene or polypropylene, and nonwoven fabrics of polyester or polyimide. In addition, a pulp sheet is also usable as a separator. Actually, there is strict restrictions in view of costs, characteristics of a capacitor and other physical characteristics such as mechanical strength. A preferable separator is found to be a composite separator prepared by employing nonwoven fabrics of polyester as a base material and coating it with cellulose. The composite separator weighs 32–40 g/m², and is 50–60 μm in thickness. And the gas permeability thereof is 50–150 (sec/100 cc).

The electrolyte used for the electric double layer capacitor in accordance with the present invention should be superior in wettability for the polarization electrode and the separator. It is also preferable that the electrolyte does not corrode nor resolve the polarization electrode and the separator. Besides, the electrolyte is preferable to be a high ionic conductive substance.

Such a preferable electrolyte is obtainable by mixing alkaline metal salts of organic acid or inorganic acid, ammonium salt or quaternary ammonium salt as a solute, and nitriles, sulfoxides, amides, pyrrolidones, carbonates, or lactones as an organic solvent. In particular, the most preferable electrolyte can be prepared by mixing 70–90 wt % of γ-butyrolactone, 5–30 wt % of propylene carbonate and 5–20 wt % of tetraethyl ammonium perchlorate. It gives satisfactory results in the characteristics as a capacitor (capacitance, internal resistance, leak current, etc.), the temperature characteristic at a high temperature, time-dependent variations of several characteristics, and a break-down voltage.

Figure 5A:
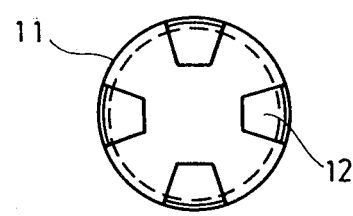
FIG. 5(a) and FIG. 5(b) are a top view and a side view of a casing used for a capacitive device in accordance with the present invention, respectively.
Figure 5B:
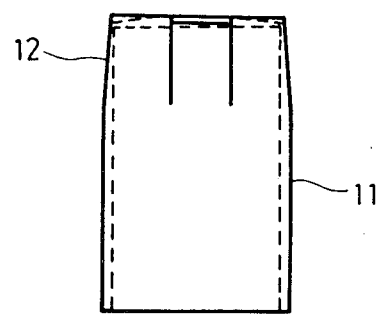

FIG. 5(a) and FIG. 5(b) are a top view and a side view of a casing 11 used for a capacitive device in accordance with the present invention. The cylindrical casing of aluminum is provided with thinner portions at top edges 12. These thinner portions serve as an explosion-proof valve. There are two ways to make the top edges thinner. It is possible to design a mold for molding in a manner that a molded casing has thinner portions at the top edges. Alternatively, such thinner portions are also obtainable by cutting or notching the top edges of the casing 11 after molding. The casing 11 shown in FIG. 5(a) and FIG. 5(b) has four thinner portions at the top edges in a geometrically symmetrical manner. It is thus advantageous that the weakest portion among four thinner portions serves as an explosion-proof valve for the capacitive device of the present invention.

Figure 6A:
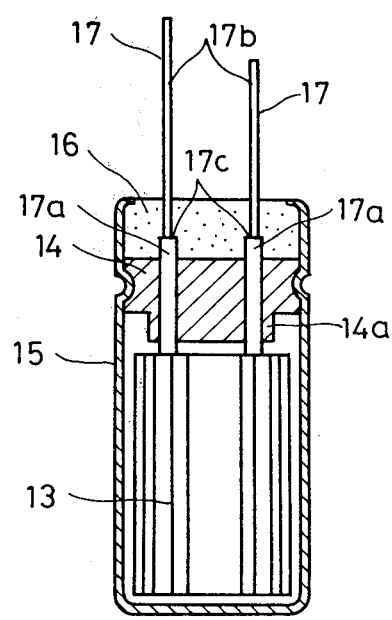
FIG. 6(a) and FIG. 6(b) are elevational sectional views of completed electric double layer capacitors in accordance with the present invention.
Figure 6B:
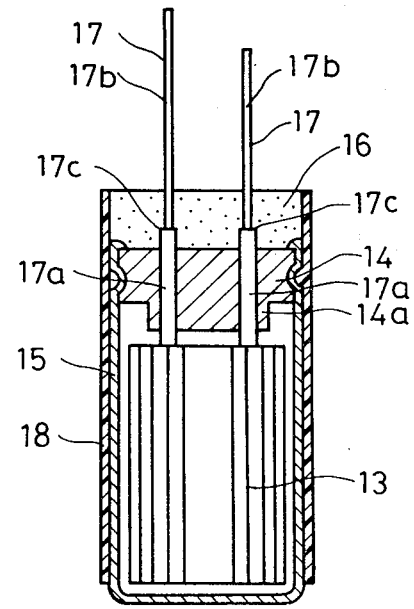

FIG. 6(a) and FIG. 6(b) are elevational sectional views of completed electric double layer capacitors in accordance with the present invention. A cylindrical casing 15 (which may be the casing 11 of FIG. 5(b) placed upside down) is used as a capsule. An elastic rubber material 14 and a sealing resin 16 are used for sealing an electric double layer capacitor 13 in the casing 15. The elastic rubber material should be resistant to the electrolyte. It is also required that the elastic rubber material is high in gas barrier nature and that it is hardly degraded at a high temperature. A preferable rubber material is EPT (ethylene propylene terpolymer) or IIR (isobutylene-isoprene rubber).

The sealing resin should also be resistant to the electrolyte. A preferable sealing resin is selected from an epoxy resin, an acrylic acid resin or a silicone resin in view of heat-resistant, adherence and air-tight characteristics, and working conditions (hardening temperature and time, pot life, safety grounds, etc.). In particular, the epoxy resin is most effective. It is important that welded parts 17c of internal lead wires 17a and external lead wires 17b are completely buried in the sealing resin 16. The rubber material 14 has a protruded portion 14a at the upper part thereof, which protruded portion 14a is disposed apart both from the electric double layer capacitor 13 and the inner wall of the casing 15.

There are two ways to seal the electric double layer capacitor of the present invention in the casing 15, as shown in FIG. 6(a) and FIG. 6(b). In FIG. 6(a), the casing 15 is firstly sealed by the rubber material 14 and then sealed by the sealing resin 16 at the opening part of the casing 15. In this case, lead wires 17 penetrate through the rubber material, but the welded portions 17c are completely buried in the sealing resin 16. On the other hand, the casing 15 is covered with a cover tube 18 in FIG. 6(b). In this case, the opening part of the casing 15 is sealed only by the rubber material 14, but the opening part of the cover tube 18 extending outwards is sealed by the sealing resin 16 so as to bury the welded portions 17c of the lead wires 17 in the sealing resin 16. The sealing methods described above ensure the prevention of the corrosion caused by a high humid atmosphere at the welded portions 17c of the lead wires 17.

Several making examples of the electric double layer capacitors of the present invention are described in detail in the following.

EXAMPLE 1

TABLE 3

(parts are by weight)

| material | conventional capacitor | capacitor of present invention |
|---|---|---|
| active carbon | 10 parts | 10 parts |
| acetylene black | 1.5 parts | 1.5 parts |
| dispersoid containing polytetrafluoroethylene | 6 parts | 3 parts |
| polyvinylpyrrolidone | none | 2 parts |

Table 3 is a list showing materials and mixing ratios thereof used to form the polarization electrode of the capacitive device in accordance with the present invention. Active carbon produced by Shikoku Chemical Works Ltd. of Japan is obtained on the market. It has the following characteristics.

| | | |
|---|---|---|
| (i) | color | black |
| (ii) | smell | odorless |
| (iii) | taste | tasteless |
| (iv) | fineness | −300 mesh 50–70%<br>+50 mesh under 10%<br>+30 mesh 0% |

N.B. −300 mesh: grains passed; +50 mesh: grains do not pass; other grain sizes are between −300 −50 meshes.

| (v) | bulk density | 0.20–0.25 g/cc |
|---|---|---|
| (vi) | adsorbing power | decoloring power for Methylene Blue . . . 13–15cc<br>adsorption amount of $I_2$ . . . 1,000–1,200mg |
| (vii) | ash content | below 0.8% |
| (viii) | water content | below 8.0% |

Acetylene black produced by Denki Kagaku Kogyo Kabushiki Kaisha of Japan is obtained on the market. It has the following characteristics.

| (i) color | black |
|---|---|
| (ii) smell | odorless |
| (iii) taste | tasteless |
| (iv) carbon amount | over 99% |

-continued

| | |
|---|---|
| (v) electric resistance | below 0.25Ω . cm (measured by use of a weight of 50 Kg/cm²) |
| (vi) adsorption amount of hydrochloric acid | more than 14.0 ml/5g |
| (vii) bulk specific gravity | over 0.03 and less than 0.06 |
| (viii) water content | below 0.4% |
| (ix) ash content | below 0.3% |

A dispersoid containing a polytetrafluoroethylene is also obtained on the market. It is produced by Daikin Kogyo Co., Ltd. of Japan. The dispersoid is an aqueous dispersion containing fine grains of polytetrafluoroethylene. It is obtained by concentrating a dispersed colloid prepared by emulsion polymerization up to a certain concentration. The dispersion condition is stabilized by non-ionic activator. The dispersion has the following characteristics.

| | |
|---|---|
| (i) content rate of the resin grains | 60 wt % |
| (ii) average grain size | 0.3 μm |
| (iii) specific gravity | 1.5 (at 25° C.) |
| (iv) coefficient of viscosity | 25 cm . poise (at 25° C.) |

Polyvinylpyrrolidone (registered trade mark) is produced by BASF Japan and obtained on the market. It is poly-N-vinyl-2-pyrrolidone (PVP) called as Luviskol K Resins. There are two kinds, K-30 of 40,000 molecular weight and K-90 of 700,000 molecular weight. The former is employed in this example. It has the following characteristics.

| | |
|---|---|
| (i) color | white |
| (ii) appearance | powder |
| (iii) resin content | more than 95% |
| (iv) residue monomer | less than 0.8% |
| (v) water content | less than 5% |
| (vi) ash content | less than 0.02% |

Polarization electrodes are made by using the above-mentioned carbon electrode materials and a suitably prepared conducting member. A separator impregnated with an electrolyte is disposed between a pair of polarization electrodes to constitute an electric double layer capacitor element. The capacitor element is encapsulated in a casing to obtain a capacitor. The casing has a cylindrical size of 12.5 mmφ×35 mm. Initially, the completed capacitor has a breakdown voltage of 1.6 V and a capacitance of 10 F. After measuring the initial characteristic values, a rated voltage is applied to the capacitor for a life test lasting 1,000 hours at 70° C. The measurement results are tabled in Table 4.

TABLE 4

| | initial values | | | values after 1,000 hours at 70° C. | | | |
|---|---|---|---|---|---|---|---|
| | capacitance (F) | internal resistance (Ω) | leak current (mA) | capacitance (F) | internal resistance (Ω) | leak current (mA) | appearance |
| conventional capacitor | 10.3 | 0.53 | 0.45 | 9.2 | 0.70 | 0.40 | no change |
| capacitor of present invention | 10.5 | 0.30 | 0.30 | 9.9 | 0.40 | 0.25 | no change |

Figure 7A:
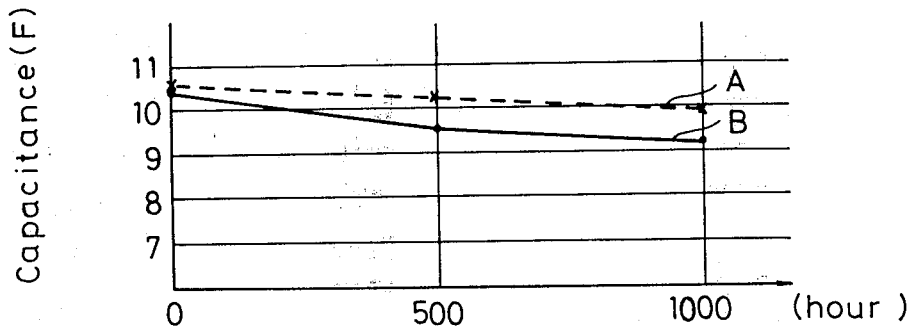
FIG. 7(a) to FIG. 7(c) are characteristic graphs to compare the electric double layer capacitors of the present invention with the conventional ones.
Figure 7B:
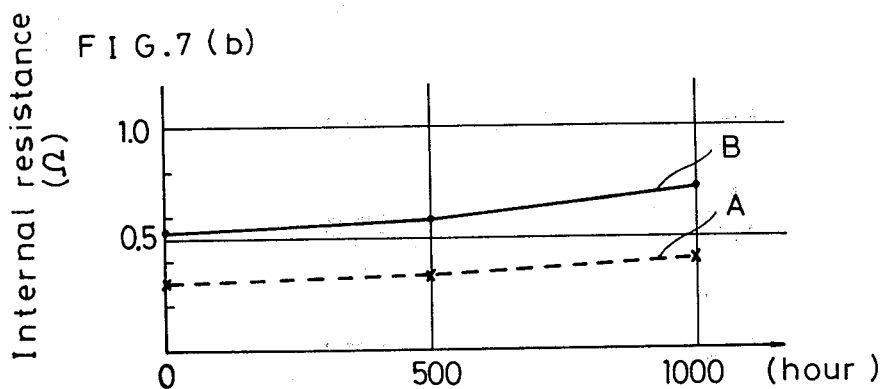
Figure 7C:
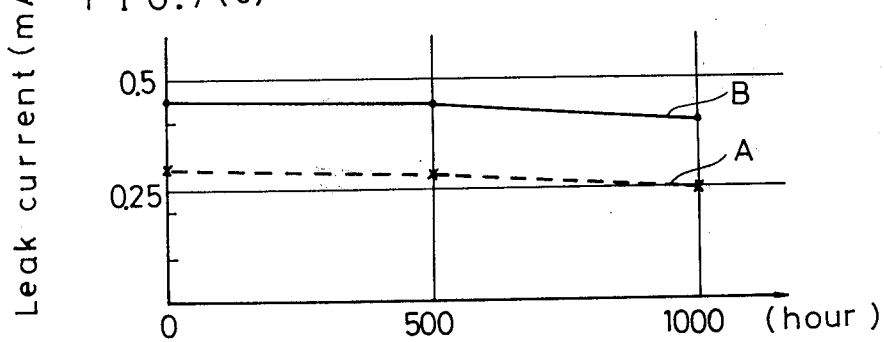

FIG. 7(a) to FIG. 7(c) are characteristic graphs for comparison of the electric double layer capacitors of the present invention (denoted by A) with the conventional ones (denoted by B) in the life test lasting 1,000 hours at 70° C.

It can be seen from Table 4 that the electric double layer capacitor using PVP as the binder shows largely improved characteristics of the internal resistance and the leak current in comparison with the conventional capacitors without using PVP. In addition, the capacitance change after the life test is also largely decreased. Therefore, the initial characteristics and the reliability of the electric double layer capacitor is largely improved in the present invention.

EXAMPLE 2

Several measurement results are obtained with aluminum expanded metal sheets having several different aperture sizes and aluminum lead wires of two kinds. The measurement results in Table 5 are strength of adherence of the aluminum lead wires to the aluminum expanded metal net of a polarization electrode, and adherence strength of a carbon electrode material to the aluminum expanded metal net.

TABLE 5

| size of aperture of expanded metal net (mm) | SW (small width) | 0.25 | 0.5 | 0.75 | 1.0 | 1.25 |
|---|---|---|---|---|---|---|
| | LW (large width) | 0.5 | 1.0 | 1.5 | 2.0 | 2.5 |
| adherence strength of Al lead wires | hard Al lead wires | X | X | X | X | X |
| | soft Al lead wires | O | O | O | Δ | X |
| adherence strength of carbon electrode material | expanded metal net of hard Al | X | Δ | O | O | Δ |
| | expanded metal net of soft Al | | | not applicable | | |

O: good,
Δ: usable,
X: unusable

The adherence strength is measured for the hard aluminum lead wire and the soft aluminum lead wire resulting in 0.4 Kg for the former and 1.2 Kg for the latter, when the aperture size is SW=0.75 mm and LW=1.5 mm.

EXAMPLE 3

Several capacitors are produced by using aluminum expanded metal net (SW=0.75 mm, LW=1.5 mm) having different aperture rate. Adherence strength of a carbon electrode material to the aluminum expanded metal net is also measured and shown in Table 6.

TABLE 6

| aperture rate (%) | 15–25 | 25–35 | 35–45 | 45–55 | 55–65 | 65–75 |
|---|---|---|---|---|---|---|
| thickness (mm) | 0.31 | 0.32 | 0.34 | 0.33 | 0.31 | 0.31 |
| net | O | O | O | O | O | Δ |
| working adherence | O | O | O | O | O | Δ |

TABLE 6-continued

| strength of lead wires | | | | | | |
|---|---|---|---|---|---|---|
| adherence of carbon electrode material | X | Δ | Δ | O | O | Δ |

O: good;
Δ: insufficient;
X: bad

TABLE 7-continued

| separator material | ca-pacitance | internal resistance | leak current | heat resistance |
|---|---|---|---|---|
| cellulose | | | | |

O O: Very good;
O: good;
X: insufficient;
X X: bad

TABLE 8

| | initial values | | | after life test lasting 1,000 hours at 70° C. with application voltage of 1.6 V | | |
|---|---|---|---|---|---|---|
| | capaci-tance (F) | internal resistance (Ω) | leak current (mA) | capacitance change (%) | internal resistance (Ω) | leak current (mA) |
| (4) nonwoven fabric of polypropylene | 10.1 | 0.30 | 0.40 | −15.1 | 0.45 | 0.40 |
| (5) polypropylene film | 10.2 | 0.32 | 0.25 | −17.5 | 0.50 | 0.26 |
| (8) nonwoven fabric of polyethylene and cellulose | 10.1 | 0.31 | 0.28 | −12.3 | 0.43 | 0.27 |
| (9) nonwoven fabric of polypropylene and cellulose | 10.0 | 0.33 | 0.26 | −13.5 | 0.44 | 0.25 |
| (10) nonwoven fabric of polyester and cellulose | 10.3 | 0.32 | 0.25 | −10.8 | 0.42 | 0.25 |

Figure 8:
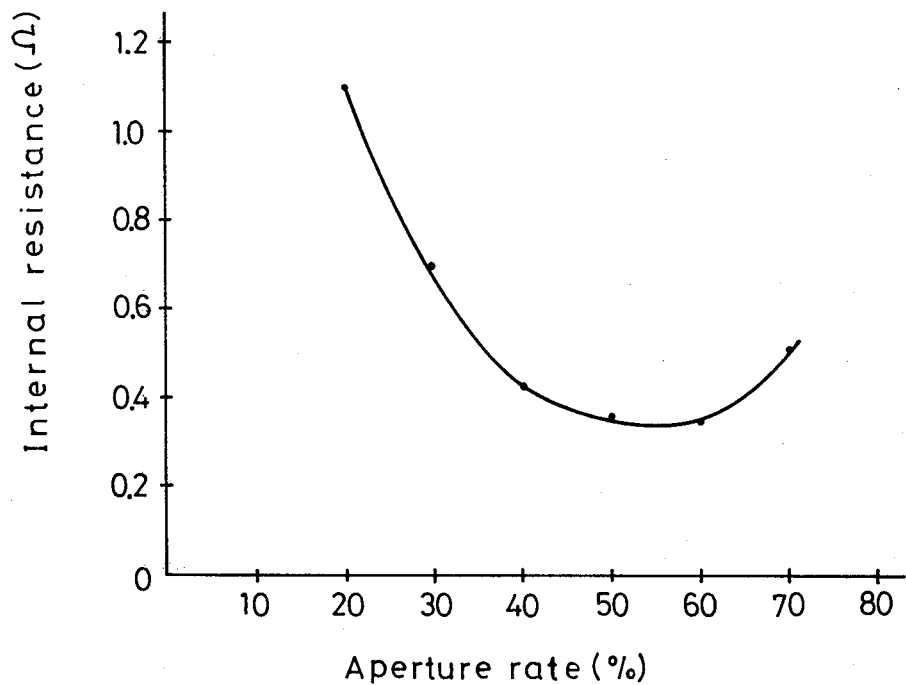
FIG. 8 is a graph showing a relationship between an internal resistance (in $\Omega$) and an opening rate (in %) of the expanded metal sheet used for the polarization electrode in the electric double layer capacitor in accordance with the present invention.

An internal resistance is also measured. FIG. 8 is a graph showing a relationship between the internal resistance (in Ω) and an aperture rate (in %) of the expanded metal sheet used for the polarization electrode in the electric double layer capacitor in accordance with the present invention.

EXAMPLE 4

Several electric double layer capacitors are produced by using several kinds of separators. Table 7 is a comparison table showing several characteristics of the electric double layer capacitors using several separators. Table 8 is another comparison table showing characteristic changes after a life test lasting 1,000 hours at 70° C. with an application voltage of 1.6 V.

TABLE 7

| separator material | ca-pacitance | internal resistance | leak current | heat resistance |
|---|---|---|---|---|
| (1) kraft paper | X X | X X | O | O |
| (2) Manila paper | O | O | X X | O |
| (3) nonwoven fabric of polyethylene | O | O | O | X |
| (4) nonwoven fabric of polypropylene | O | O | O | O |
| (5) polypropylene film | O | O | O O | O |
| (6) nonwoven fabric of polyester | O | O | X | O |
| (7) Manila paper and cellulose | O | O | O O | X |
| (8) nonwoven fabric of polyethylene and cellulose | O | O | O O | O |
| (9) nonwoven fabric of polypropylene and cellulose | O | O | O O | O |
| (10) nonwoven fabric of polyester and | O | O | O O | O |

EXAMPLE 5

Several electric double layer capacitors are produced by using several kinds of electrolytes comprising γ-butyrolactone, propylene carbonate and tetraethyl ammonium perchlorate in several different mixing ratios.

TABLE 9

| | | | (parts are by weight) | |
|---|---|---|---|---|
| α-butyro-lactone (parts) | propy-lene carbo-nate (parts) | tetra-ethyl ammo-nium per-chlorate (parts) | rate of capacitance change (%) | |
| | | | −25° C./20° C. | 70° C., 1,000H |
| 100 | 0 | 15 | −13 | −22 |
| 90 | 10 | 15 | −13 | −21 |
| 80 | 20 | 15 | −13 | −18 |
| 70 | 30 | 15 | −14 | −10 |
| 60 | 40 | 15 | −15 | −10 |
| 50 | 50 | 15 | −18 | −9 |
| 40 | 60 | 15 | −20 | −9 |
| 30 | 70 | 15 | −22 | −9 |
| 20 | 80 | 15 | −25 | −9 |
| 10 | 90 | 15 | −25 | −9 |
| 0 | 100 | 15 | −25 | −9 |
| 70 | 30 | 5 | −23 | −20 |
| 70 | 30 | 10 | −20 | −15 |
| 70 | 30 | 15 | −14 | −10 |
| 70 | 30 | 20 | −15 | −10 |
| 70 | 30 | 25 | −18 | −10 |

EXAMPLE 6

Several electric double layer capacitors are produced by employing several kinds of rubber materials as a sealing means. Table 10 is a comparison table showing capacitance and appearance changes of the capacitors after a life test lasting 1,000 hours at 70° C. with an application voltage of 1.6 V. It is seen from Table 10 that preferable rubber materials are IIR (isobutylene-isoprene rubber), EPT (ethylene propylene terpolymer), silicone rubber and elastics of TPE (thermoplastics elastomer).

TABLE 10

| rubber material | rate of capacitance change (%) and appearance after 1,000 hours at 70° C. | |
|---|---|---|
| NR (natural rubber) | −21 | large swelling |
| IR (isoprene rubber) | −19 | large swelling |
| BR (butadiene rubber) | −19 | large swelling |
| CR (chloroprene rubber) | −18 | large swelling |
| SBR (styrene butadiene rubber) | −17 | large swelling |
| NBR (nitrile rubber) | −18 | large swelling |
| IIR (isobutylene-isoprene rubber) | −10 | no change |
| EPT (ethylene propylene terpolymer) | −11 | no change |
| Si-rubber (silicone rubber) | −16 | no change |
| TPE (thermoplastics elastomer) | −12 | no change |

As so far described, the present invention provides novel capacitors wherein several characteristics and their reliability are improved. Some application examples of the electric double layer capacitors are briefly explained in the following.

Figure 9A:
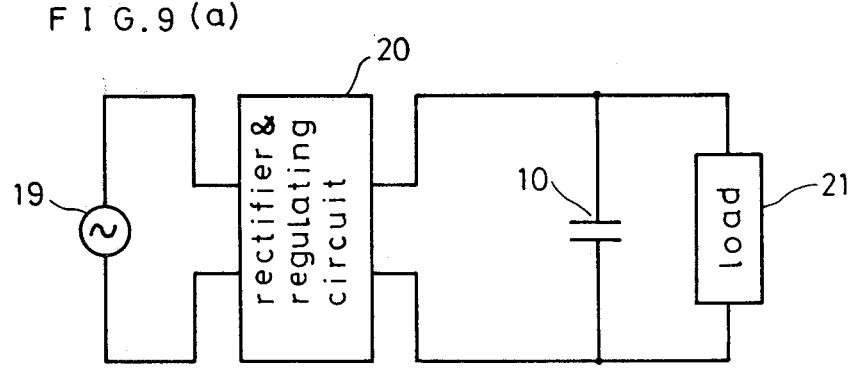
FIG. 9(a) to FIG. 9(c) are circuit diagrams showing representative examples of the application fields of the electric double layer capacitor in accordance with the present invention.
Figure 9:
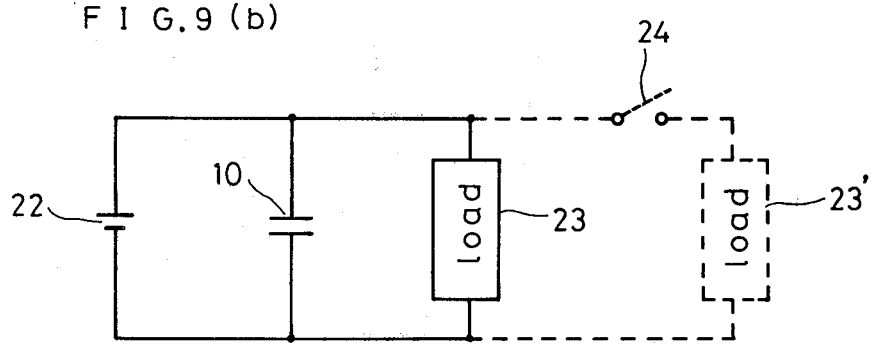
Figure 9:
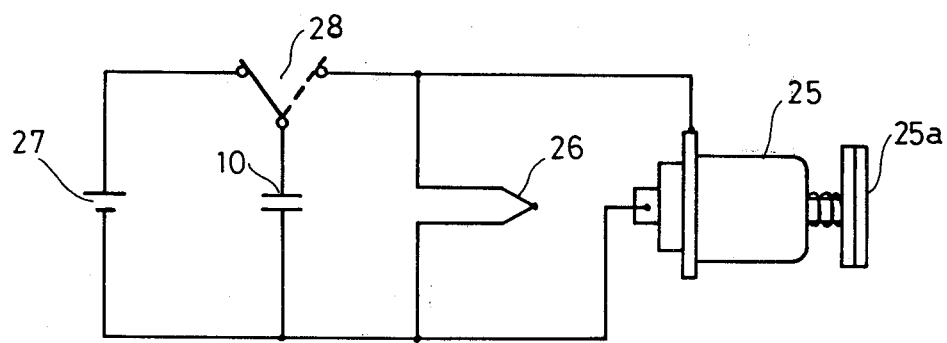

In FIG. 9(a), an electric double layer capacitor 10 of the present invention is connected across output terminals of a rectifier and regulating circuit 20, which feeds an electric power from a power source 19 to an electric apparatus, i.e. load 21. The capacitor 10 is used as a back-up electric power source of the electric apparatus 21, for example, in a semiconductor memory device such as RAM (random access memory) devices at the electric power failure.

FIG. 9(b) shows a battery 22 of a small capacity, an electric double layer capacitor 10 and a load 23, and all of them are connected in parallel. In case the power source (battery 22) becomes at an overload state with respect to its load, the electric double layer capacitor 10 is used as a compensated power source. Namely, when the capacity of the battery 22 becomes small, a switch 24 drawn by dotted line is closed and a load 23′ drawn by a dotted line is connected to the battery 22, in parallel then the electric double layer 10 compensates the temporary shortage of power capacity. In case the room temperature goes down, the capacity of the battery 22 also becomes small, the electric double layer 10 works as a compensating power source, too.

FIG. 9(c) shows a part of a safety device for a going-out of the frame in a gas apparatus. A safety gas cock 25 has a push button 25a for ignition and is connected to a thermoelectric couple 26 and the electric double layer 10 or a battery 27 alternatively by a switch 28. The switch 28 is interlocked with the push button 25a of the safety gas cock 25. In these structure, when push button 25a is pushed, the switch 28 is changed as shown by a dotted line, and thereby the electric double layer 10 feeds an electric power to the thermoelectric couple 26 in order to heat it at a specified time. Therefore, in this application example, the thermoelectric couple 26 gets hot without keeping on pushing the push button 25a. After temperature of the thermoelectric couple 26 rises, and a voltage across both terminals of the thermoelectric couple 26 exceeds a specified value, the safety cock 25 becomes locked to feed gas flow.

What is claimed is:

1. An electric double layer capacitor comprising:
a pair of polarization electrodes each electrode including a conducting member formed from an expanded metal sheet with a number of expanded holes, and a carbon electrode material including active carbon and a polyvinyl pyrrolidone binder; and
a separator impregnated with an electrolyte and disposed between said polarization electrodes.

2. An electric double layer capacitor in accordance with claim 1 wherein said separator includes a composite porous sheet formed from nonwoven fabrics selected from the group consisting of polyethylene, polypropylene and polyester, and a cellulose coating layer thereon.

3. An electric double layer capacitor in accordance with claim 1 wherein said expanded metal sheet is an aluminum sheet having an opening rate of 40-60% and said expanded holes have a size of 0.5-1.0 mm in a small width and 1.0-2.0 mm in a large width.

4. An electric double layer capacitor in accordance with claim 1 wherein said electrolyte is a mixed solvent of propylene carbonate, γ-butyrolactone and tetraethylammonium perchlorate.

5. An electric double layer capacitor in accordance with claim 1 further comprising internal lead wires of high purity soft aluminum for attaching to said conducting members by pins.

6. An electric double layer capacitor in accordance with claim 4 wherein said electrolyte is a mixed solvent comprising propylene carbonate of 5-30 wt %, γ-butyrolactone of 70-90 wt % and tetraethylammonium perchlorate of 5-20 wt %.

7. An electric double layer capacitor in accordance with claim 5 further comprising external lead wires of a solderable metal welded to said internal lead wires.

8. An electric double layer capacitor in accordance with claim 7 further comprising
a casing for encapsulating said pair of polarization electrodes, said pair of conducting members and said separator in a wound form and impregnated with said electrolyte, and
an elastic rubber material and a sealing resin for sealing an opening of said casing, and
said external lead wires passing through said elastic rubber material and said sealing resin.

9. An electric double layer capacitor in accordance with claim 8 wherein said elastic rubber material is selected from the group consisting of EPT (ethylene propylene terpolymer) and IIR (isobutylene-isoprene rubber).

10. An electric double layer capacitor in accordance with claim 8 or 9 wherein said electric rubber material has a protruded portion at the lower part thereof disposed apart from said wound polarization electrodes and the internal wall of said casing.

11. An electric double layer capacitor in accordance with claim 8 wherein said casing has thinner portions near bottom edges thereof.

12. An electric double layer capacitor in accordance with claim 8 wherein said sealing resin is selected from the group consisting of an epoxy resin, an acrylic acid resin and a silicone resin.

13. An electric double layer capacitor in accordance with claim 8 wherein welded portions of said internal and said external lead wires are buried in said sealing resin.

14. An electric double layer capacitor in accordance with claim 8 wherein said sealing resin seals said opening of said casing and said elastic rubber material is disposed between said wound polarization electrodes and said sealing resin.

15. An electric double layer capacitor in accordance with claim 8 further comprising a cover tube for covering said casing, wherein said sealing resin seals an opening part of said cover tube.

* * * * *